United States Patent
Doi et al.

(10) Patent No.: US 10,509,270 B2
(45) Date of Patent: Dec. 17, 2019

(54) LIQUID CRYSTAL DISPLAY APPARATUS

(71) Applicant: Japan Display Inc., Minato-ku (JP)

(72) Inventors: Takashi Doi, Kanazawa (JP); Toshihiro Ninomiya, Nonoichi (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/589,492

(22) Filed: May 8, 2017

(65) Prior Publication Data
US 2017/0242309 A1  Aug. 24, 2017

Related U.S. Application Data

(63) Continuation of application No. 14/808,822, filed on Jul. 24, 2015, now Pat. No. 9,690,410, which is a (Continued)

(30) Foreign Application Priority Data

Jun. 20, 2011 (JP) ................................ 2011-136437

(51) Int. Cl.
*G02F 1/1343* (2006.01)
*G06F 3/041* (2006.01)
(Continued)

(52) U.S. Cl.
CPC ...... *G02F 1/134309* (2013.01); *G02F 1/1368* (2013.01); *G02F 1/13338* (2013.01);
(Continued)

(58) Field of Classification Search
CPC .......... G02F 1/134309; G02F 1/13338; G02F 1/13394
See application file for complete search history.

(56) References Cited

U.S. PATENT DOCUMENTS 6,057,904 A    5/2000  Kim et al.
7,173,681 B2   2/2007  Takahashi et al.
(Continued)

FOREIGN PATENT DOCUMENTS

JP    2001-235763    8/2001
JP    2007-322610   12/2007
(Continued)

OTHER PUBLICATIONS

Office Action dated Apr. 16, 2013 in Japanese Patent Application No. 2011-136437 (with English translation).
Machine Translation of JP 2007-322610.

*Primary Examiner* — Lucy P Chien
(74) *Attorney, Agent, or Firm* — Oblon, McClelland, Maier & Neustadt, L.L.P.

(57) ABSTRACT

According to one embodiment, a liquid crystal display apparatus includes a display region including a plurality of display pixels arrayed in a matrix, an array substrate including a plurality of first electrodes which are arrayed in a matrix, second electrodes which are arranged on the same layer as a layer of the first electrodes and connect the first electrodes to each other, and third electrodes which are arrayed in a matrix on the first electrodes and the second electrodes, a countersubstrate which is arranged to face the array substrate, and a liquid crystal layer which is interposed between the array substrate and the countersubstrate.

5 Claims, 7 Drawing Sheets

Related U.S. Application Data continuation of application No. 13/487,476, filed on Jun. 4, 2012, now Pat. No. 9,122,087.

(51) Int. Cl.
| | |
|---|---|
| *G09G 3/36* | (2006.01) |
| *G06F 3/01* | (2006.01) |
| *G06F 3/0354* | (2013.01) |
| *G02F 1/1333* | (2006.01) |
| *G02F 1/1339* | (2006.01) |
| *G02F 1/1362* | (2006.01) |
| *G02F 1/1368* | (2006.01) |

(52) U.S. Cl.
CPC .... *G02F 1/13394* (2013.01); *G02F 1/134336* (2013.01); *G02F 1/136286* (2013.01); *G06F 3/017* (2013.01); *G06F 3/03545* (2013.01); *G06F 3/0412* (2013.01); *G09G 3/3655* (2013.01); *G09G 3/3696* (2013.01); *G02F 2201/121* (2013.01); *G02F 2201/123* (2013.01); *G06F 2203/04101* (2013.01); *G06F 2203/04808* (2013.01)

(56) References Cited

U.S. PATENT DOCUMENTS

| | | | |
|---|---|---|---|
| 7,859,521 B2 | 12/2010 | Hotelling et al. | |
| 8,294,863 B2 | 10/2012 | Ninomiya et al. | |
| 8,797,466 B2 | 8/2014 | Doi et al. | |
| 9,177,976 B2 * | 11/2015 | Hsu | H01L 27/1259 |
| 2003/0071958 A1 | 4/2003 | Wu et al. | |
| 2010/0134741 A1 | 6/2010 | Jeong | |
| 2012/0176561 A1 * | 7/2012 | Kim | G02F 1/134363 |
| | | | 349/46 |
| 2015/0014693 A1 * | 1/2015 | Lee | H01L 27/124 |
| | | | 257/72 |

FOREIGN PATENT DOCUMENTS

| | | |
|---|---|---|
| JP | 2009-251174 | 10/2009 |
| JP | 2010-230744 | 10/2010 |
| JP | 2010-231773 | 10/2010 |
| JP | 2012-517051 | 7/2012 |

\* cited by examiner

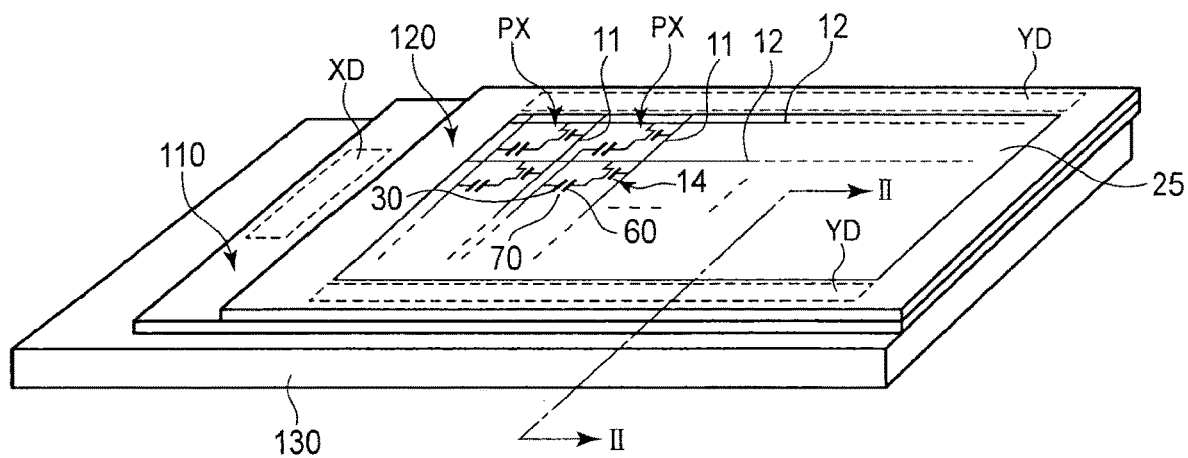
F I G. 1

LIQUID CRYSTAL DISPLAY APPARATUS

CROSS-REFERENCE TO RELATED APPLICATIONS

This application is a continuation of U.S. application Ser. No. 14/808,822 filed Jul. 24, 2015 and is based upon and claims the benefit of priority from prior Japanese Patent Application No. 2011-136437, filed Jun. 20, 2011, the entire contents of each of which are incorporated herein by reference.

FIELD

Embodiments described herein relate generally to a liquid crystal display apparatus.

BACKGROUND

Flat display apparatuses are currently undergoing active development, particularly liquid crystal displays, which are finding application in various fields by dint of such desirable features as lightness, thinness, and low energy consumption. A liquid crystal display is realized by confining a liquid crystal layer between paired substrates, the display producing an image as a result of the modulation factor of light passing through the liquid crystal layer being controlled in accordance with an electric field between a pixel electrode and a common electrode.

For liquid crystal display apparatuses, there are known a method of controlling the liquid crystal alignment state by applying, to the liquid crystal layer, a longitudinal electric field in a direction almost perpendicular to the substrate surfaces of the paired substrates, and a method of controlling the liquid crystal alignment state by applying, to the liquid crystal layer, a transverse electric field (including even a fringe electric field) in a direction almost parallel to the surfaces of the paired substrates.

A liquid crystal display apparatus using a transverse electric field especially receives attention in terms of a wider view angle. A transverse electric field liquid crystal display apparatus in the IPS (In-Plane Switching) mode, FFS (Fringe Field Switching) mode, or the like includes pixel electrodes and common electrodes formed on an array substrate. Liquid crystal molecules are switched by a transverse electric field almost parallel to the major surface of the array substrate.

There is also proposed a liquid crystal display apparatus including a touch sensor which detects that a user's finger or pen tip has touched the display unit. The touch sensor is formed by further superposing a sensor substrate including sensor electrodes on the display unit of the liquid crystal display apparatus or integrally forming sensor electrodes on one of paired substrates of the liquid crystal display apparatus.

BRIEF DESCRIPTION OF THE DRAWINGS

FIG. 1 is a perspective view for explaining an example of the arrangement of a liquid crystal display apparatus according to an embodiment;

DETAILED DESCRIPTION

Figure 2:
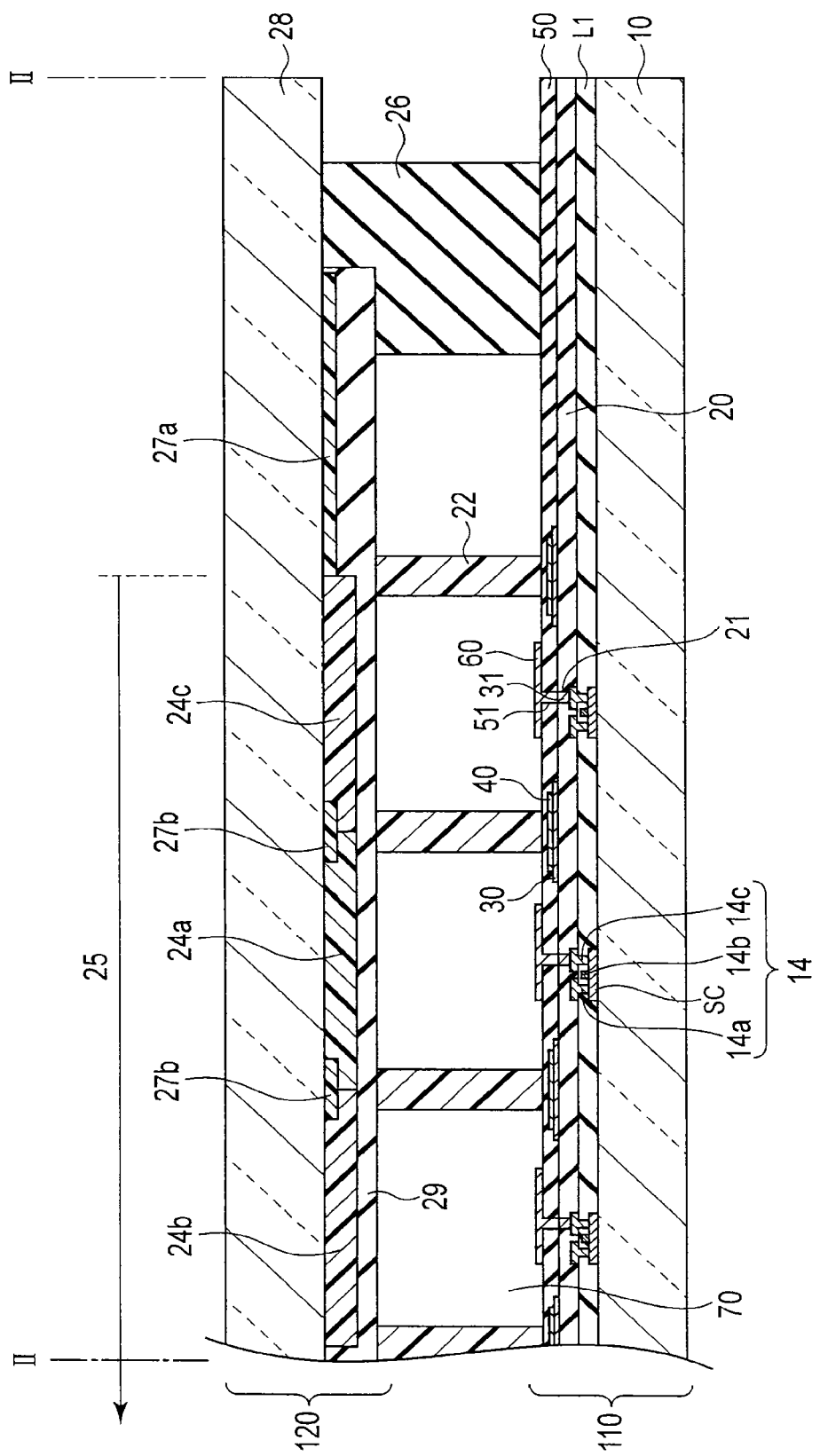
FIG. 2 is a sectional view showing an example of the section of the liquid crystal display apparatus shown in FIG. 1 taken along a line II-II.

In general, according to one embodiment, a liquid crystal display apparatus comprises a display region including a plurality of display pixels arrayed in a matrix; an array substrate including a plurality of first electrodes which are arrayed in a matrix, second electrodes which are arranged on the same layer as a layer of the first electrodes and connect the first electrodes to each other, and third electrodes which are arrayed in a matrix on the first electrodes and the second electrodes; a countersubstrate which is arranged to face the array substrate; and a liquid crystal layer which is interposed between the array substrate and the countersubstrate.

A liquid crystal display apparatus according to an embodiment will now be described with reference to the drawings.

FIG. 1 schematically shows an example of the liquid crystal display apparatus according to the embodiment. The liquid crystal display apparatus includes a liquid crystal display panel including an array substrate 110, a countersubstrate 120 which is arranged to face the array substrate 110 at a predetermined interval, a liquid crystal layer 70 (FIG. 2) interposed between the array substrate 110 and the countersubstrate 120, and a display region 25 including display pixels PX arrayed in a matrix, and a backlight unit 130 which illuminates the liquid crystal display panel from the back.

FIG. 2 shows an example of the section of the liquid crystal display panel shown in FIG. 1 taken along a line II-II. The liquid crystal display apparatus according to the embodiment is a liquid crystal display apparatus in the FFS mode in which the alignment state of the liquid crystal layer is controlled using a transverse electric field.

The array substrate 110 includes a transparent insulating substrate 10 of glass or the like, pixel driving interconnections arranged on the transparent insulating substrate 10, switching elements 14, insulating films L1 and 50, a planarization film 20, common electrodes (first and second electrodes) 30, sensor electrodes (third electrodes) 40, pixel electrodes (fourth electrodes) 60, an alignment film (not shown), and a driving circuit. The pixel driving interconnections include scanning lines 11 running along rows in which the plurality of display pixels PX are arrayed, and signal lines 12 running along columns in which the plurality of display pixels PX are arrayed.

The driving circuit includes scanning line driving circuits YD which are arranged in a frame region around the display region 25 and drive the plurality of scanning lines 11, and a signal line driving circuit XD which drives the plurality of signal lines 12.

The scanning line driving circuits YD are arranged on two sides of the display region 25 in a direction in which the scanning lines 11 run. The plurality of scanning lines 11 running from the display region 25 are electrically connected to the scanning line driving circuits YD. The plurality of signal lines 12 running from the display region 25 are electrically connected to the signal line driving circuit XD.

A flexible board (not shown) is connected to the end of the array substrate 110. A control signal and video signal are supplied from a signal source (not shown) to the scanning line driving circuits YD and signal line driving circuit XD via the flexible board.

The scanning lines 11 run along the rows of the display pixels PX arrayed in a matrix in the display region 25. The signal lines 12 run along the columns of the display pixels PX arrayed in a matrix in the display region 25.

Each switching element 14 is arranged near a position where the scanning line 11 and signal line 12 cross each other. The switching element 14 is arranged on an undercoat layer (not shown) arranged on the transparent insulating substrate 10. The switching element 14 includes a thin-film transistor including an amorphous silicon or polysilicon semiconductor layer SC, gate electrode 14b, source electrode 14a, and drain electrode 14c.

A gate insulating film is arranged on the semiconductor layer SC of the switching element 14. The gate electrode 14b of the switching element 14 is arranged on the gate insulating film. The source electrode 14a and drain electrode 14c of the switching element 14 are connected to the semiconductor layer SC in a contact hole formed in the insulating film L1.

The gate electrode 14b of the switching element 14 is electrically connected to (or formed integrally with) the corresponding scanning line 11. The source electrode 14a of the switching element 14 is electrically connected to (or formed integrally with) the corresponding signal line 12. The drain electrode 14c of the switching element is electrically connected to the corresponding pixel electrode 60 in contact holes 21 and 51 (described later).

The scanning line driving circuit YD drives the scanning line 11 to apply a voltage to the gate electrode 14b of the switching element 14. Then, the source electrode 14a and drain electrode 14c are rendered conductive to turn on the switching element 14 for a predetermined period. While the switching element 14 is on, a video signal is supplied from the signal line 12 to the pixel electrode 60 via the switching element 14.

The planarization film 20 is arranged on the switching element 14. In the embodiment, the planarization film 20 is a transparent organic insulating film, and the film thickness of the planarization film 20 is approximately 3 μm. The planarization film 20 is arranged in the entire display region 25 except for the contact holes 21. The contact hole 21 is formed in the planarization film 20 on the drain electrode 14c of the switching element 14 to electrically connect the pixel electrode 60 (described later). The common electrodes 30 are arranged on the planarization film 20.

Figure 3:
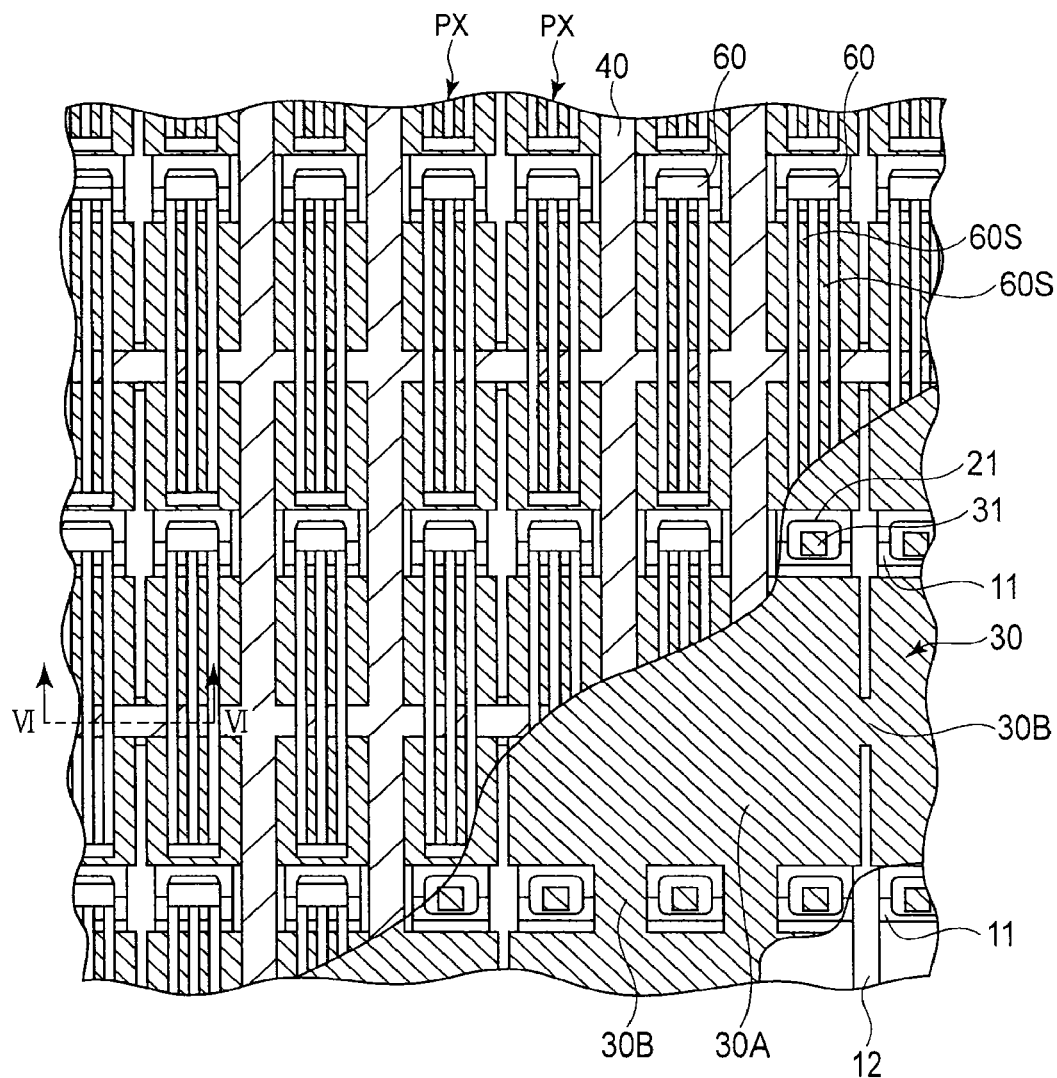
FIG. 3 is a plan view for explaining an example of the arrangement of the display region of the liquid crystal display apparatus shown in FIG. 1.

FIG. 3 shows an example of the arrangement of the display region 25 of the array substrate 110. In FIG. 3, the pixel electrodes 60 and sensor electrodes 40 are partially omitted to represent the shape of the common electrodes 30.

In a color-display-type liquid crystal display apparatus, the plurality of display pixels PX include color pixels of a plurality of types. In the embodiment, the plurality of display pixels PX include red display pixels for displaying red, green display pixels for displaying green, and blue display pixels for displaying blue. One picture element is formed from color pixels of the three types, that is, red, green, and blue display pixels. In the display region 25, red display pixels, green display pixels, and blue display pixels are periodically aligned in a direction in which the scanning lines 11 run, and color pixels of the same type are aligned in a direction in which the signal lines 12 run.

Figure 4:
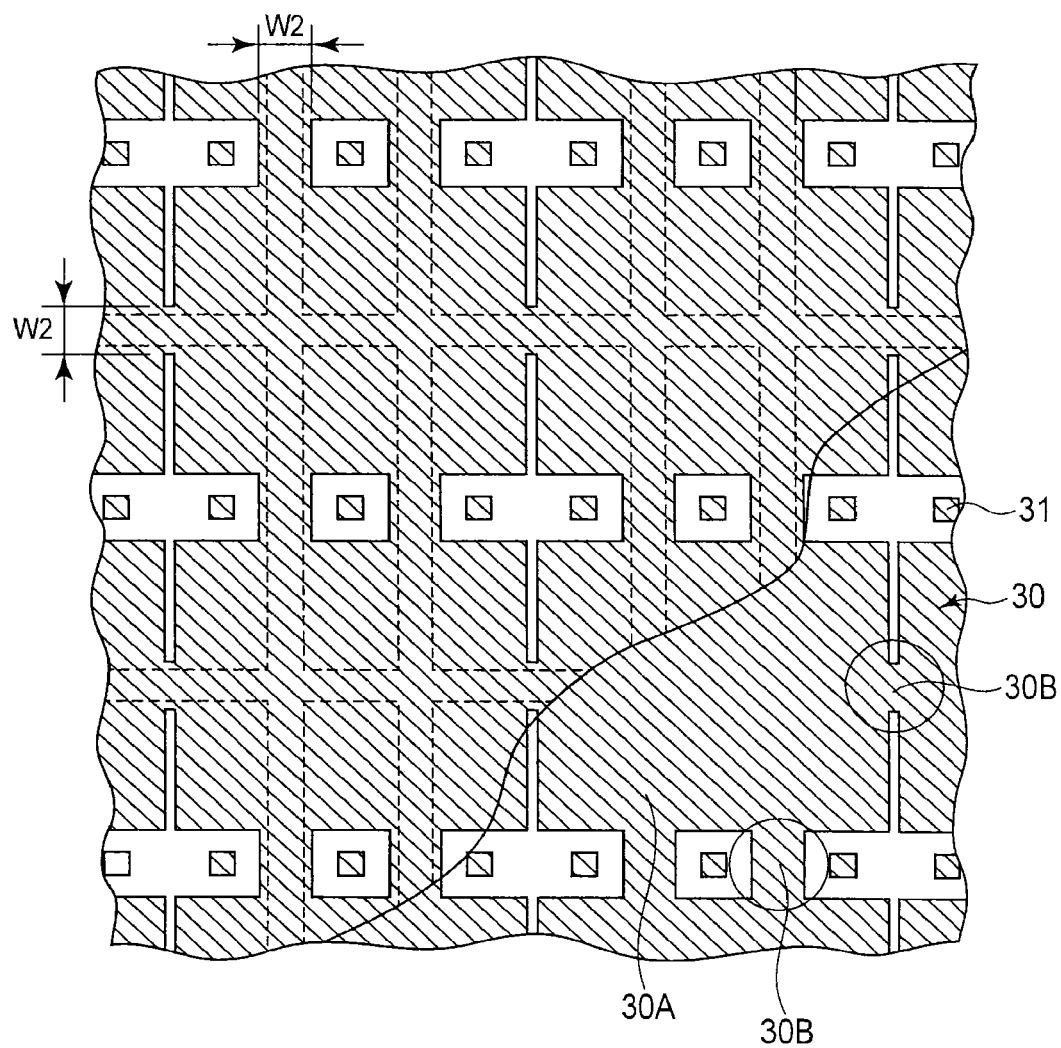
FIG. 4 is a plan view for explaining an example of the arrangement of common electrodes arranged in the display region of the liquid crystal display apparatus shown in FIG. 1.

FIG. 4 is a plan view for explaining an example of the arrangement of the common electrodes 30.

The common electrode 30 is a conductive oxide film, and is consisting of a transparent electrode material such as indium tin oxide (ITO) or indium zinc oxide (IZO). The common electrodes 30 arranged at the end of the display region 25 extend to the frame region, and receive a common voltage from, for example, an external signal source via the flexible board.

The common electrodes 30 are formed using the same pattern by taking account of the overlay accuracy with the sensor electrodes 40 (described later). More specifically, the common electrodes 30 include a plurality of first electrodes 30A which are arranged to face the plurality of pixel electrodes 60, and second electrodes 30B which electrically connect the first electrodes 30A to each other. The first electrodes 30A and second electrodes 30B are arranged on the same layer.

The first electrode 30A is arranged to face three pixel electrodes 60 arranged in one picture element. The second electrode 30B is arranged below the sensor electrode 40 (described later) between the first electrodes 30A. The width W2 of the second electrode 30B is almost equal to the width W1 of the sensor electrode 40, and is about 5 μm. The width W2 of the second electrode 30B is a width in a direction in which the signal line 12 of an electrode extending almost parallel to the scanning line 11 runs, and a width in a direction in which the scanning line 11 of an electrode extending almost parallel to the signal line 12 runs.

A connection electrode 31 of the same material as the common electrode 30 is arranged in each contact hole 21. The drain electrode 14c of the switching element 14 and the connection electrode 31 are electrically connected in the contact hole 21.

Figure 5:
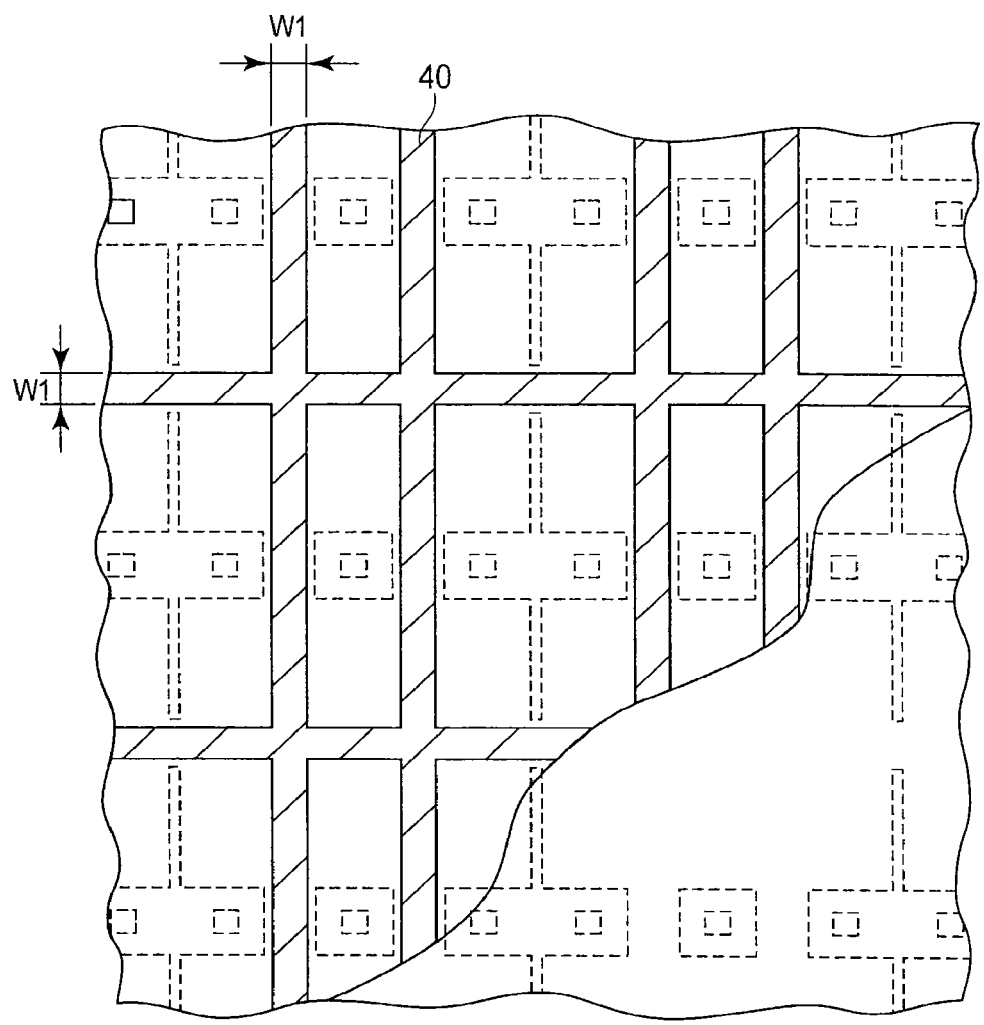
FIG. 5 is a plan view for explaining an example of the arrangement of sensor electrodes arranged in the display region of the liquid crystal display apparatus shown in FIG. 1.

FIG. 5 is a plan view for explaining an example of the arrangement of the sensor electrodes 40. In FIG. 5, broken lines represent the pattern shapes of the common electrodes 30 and connection electrodes 31. The sensor electrodes 40 are arranged on the common electrodes 30. The sensor electrode 40 is, for example, a multilayered electrode of aluminum and molybdenum. The sensor electrodes 40 are arrayed in a matrix, including first sensors extending almost parallel to a direction in which the scanning lines 11 run, and second sensors extending almost parallel to a direction in which the signal lines 12 run. The sensor electrodes 40 electrically connect the plurality of common electrodes 30. In the embodiment, the width W1 of the second sensor in a direction in which the scanning lines 11 run, and the width W1 of the first sensor in a direction in which the signal lines 12 run are about 5 μm.

In the embodiment, each sensor electrode 40 extending almost parallel to the signal line 12 is arranged on the signal line 12 between color pixels of predetermined two types out of red, green, and blue display pixels which are arranged periodically in a direction in which the scanning lines 11 run in the display region 25.

Figure 6:
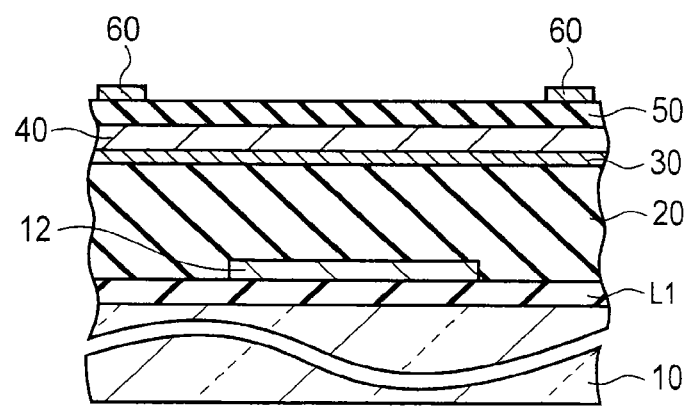
FIG. 6 is a sectional view showing an example of a section taken along a line VI-VI shown in FIG. 3.

FIG. 6 shows an example of the section of the array substrate 110 taken along a line VI-VI in FIG. 3. The sensor electrode 40 is desirably arranged at a flat portion free from a step on the common electrode 30 in the display region 25. In the embodiment, the sensor electrodes 40 are arranged on the first electrode 30A and second electrode 30B of the common electrode 30.

The sensor electrodes 40 extend to the frame region, and are electrically connected to, for example, an external sensor circuit (not shown). When detecting a touch position on the liquid crystal display apparatus according to the embodiment, the sensor circuit supplies a signal of a predetermined waveform to the sensor electrode 40. The magnitude of a capacitance generated between the user's fingertip or a stylus tip and the sensor electrode 40 changes depending on the distance between the fingertip or the like and the sensor electrode 40. The sensor circuit detects, from the output waveform of a signal output from the sensor electrode 40, a change in the potential of the sensor electrode 40 upon the change in capacitance between the fingertip or the like and the sensor electrode 40, thereby detecting a coordinate position of the sensor electrode 40 that corresponds to the position touched with the fingertip of the user, stylus tip, or the like.

Figure 7:
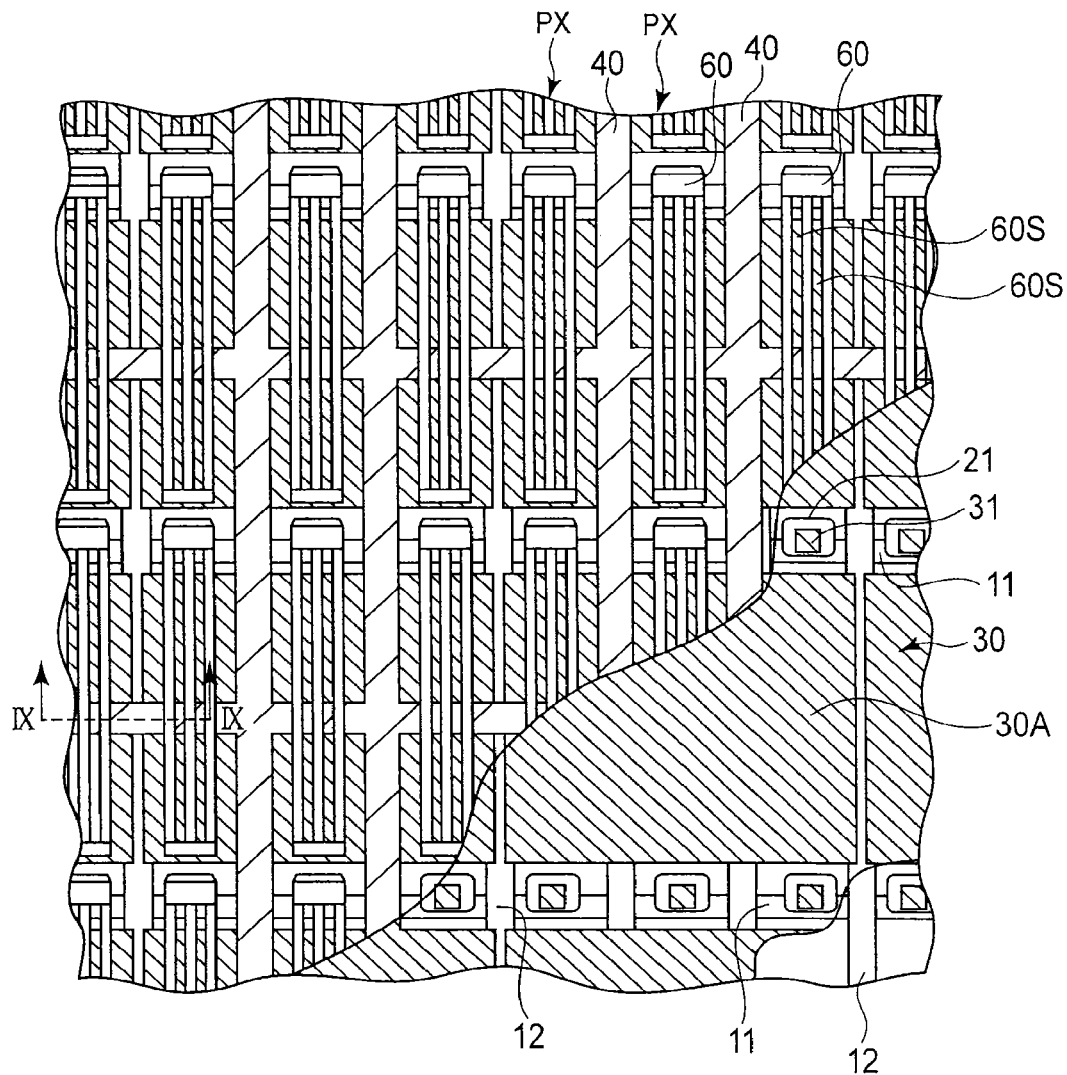
FIG. 7 is a plan view for explaining an example of the arrangement of the display region of a liquid crystal display apparatus of a comparative example.

FIG. 7 schematically shows an example of the arrangement of the display region of a liquid crystal display apparatus of a comparative example.

Figure 8:
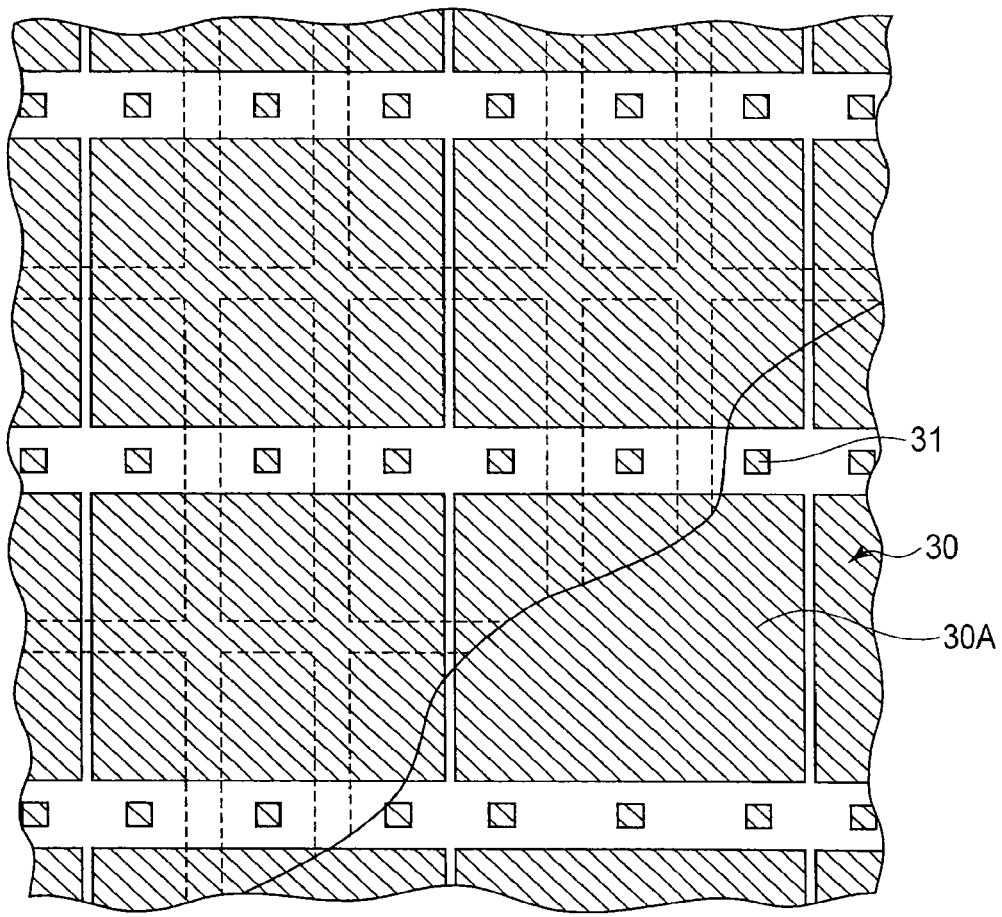
FIG. 8 is a plan view for explaining an example of the arrangement of common electrodes arranged in the display region of the liquid crystal display apparatus of the comparative example.

FIG. 8 is a plan view for explaining an example of the arrangement of a common electrode 30 and connection electrodes 31 in the liquid crystal display apparatus of the comparative example. In the liquid crystal display apparatus of the comparative example, the common electrode 30 includes a plurality of island-like first electrodes 30A. More specifically, in the liquid crystal display apparatus of the comparative example, the common electrode 30 does not include the second electrodes 30B which connect the first electrodes 30A to each other. Instead, the sensor electrodes 40 are arranged on the common electrode 30 to electrically connect the island-like first electrodes 30A. By electrically connecting the island-like first electrodes 30A by the sensor electrodes 40, the first electrodes 30A arranged in the display region 25 are set to almost the same potential. If an integral common electrode is arranged in the entire display region 25, the resistance of the common electrode increases and display nonuniformity occurs, degrading the display quality. However, when the common electrode 30 is formed from the plurality of island-like first electrodes 30A, generation of display nonuniformity can be avoided, providing a high-display-quality liquid crystal display apparatus.

Figure 9:
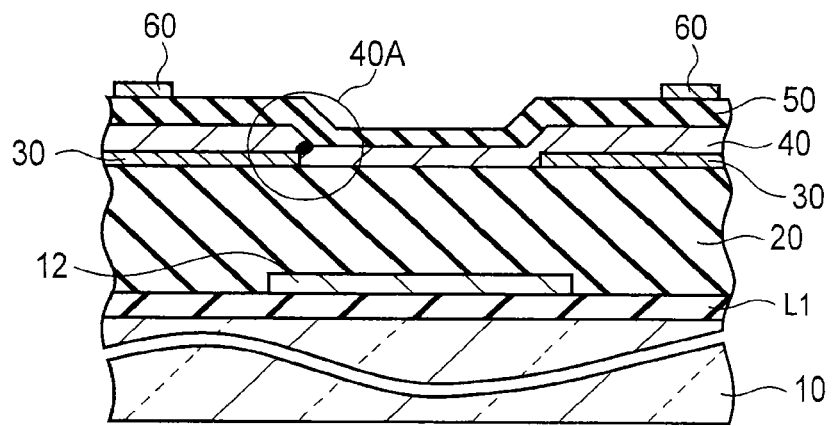
FIG. 9 is a sectional view showing an example of a section taken along a line IX-IX shown in FIG. 7.

FIG. 9 shows an example of a section taken along a line IX-IX in FIG. 7.

However, when the common electrode 30 is formed from the plurality of island-like first electrodes 30A, as described above, the sensor electrodes 40 arranged on the common electrode 30 are arranged across the pattern ends of the first electrodes 30A. The electrode may be disconnected on a step formed at the pattern end of the first electrode 30A, or a void may be formed, increasing the resistance of the sensor electrode 40.

To the contrary, in the liquid crystal display apparatus according to the embodiment, the second electrode 30B is formed below the sensor electrode 40 between the first electrodes 30A. Thus, the sensor electrode 40 is not arranged across the pattern end of the first electrode 30A. In the liquid crystal display apparatus according to the embodiment, the sensor electrode 40 is not disconnected and no void is formed, avoiding an increase in the resistance of the sensor electrode 40. That is, the embodiment can provide a liquid crystal display apparatus including low-resistance, high-quality sensor electrodes.

The insulating film 50 is arranged on the sensor electrodes 40. The insulating film 50 is, for example, an inorganic insulating film, and includes the contact holes 51 each for electrically connecting the pixel electrode 60 and connection electrode 31.

The pixel electrodes 60 are arranged on the insulating film 50, and electrically connected to the connection electrodes 31 in the contact holes 51. The pixel electrode 60 is a conductive oxide film, and is consisting of a transparent electrode material such as ITO or IZO. The alignment film (not shown) is arranged on the pixel electrodes 60.

As shown in FIG. 3, the pixel electrode 60 includes slits 60S extending almost parallel to each other. In the embodiment, the plurality of slits 60S extend almost parallel to a direction in which the signal lines 12 run.

The alignment state of the liquid crystal layer 70 is controlled by an electric field generated between the pixel electrode 60 and the common electrode 30 or between the end of the pixel electrode 60 and the sensor electrode 40. By forming the slits 60S in the pixel electrode 60, an electric field is generated between the pixel electrode 60 and the common electrode 30 even at the center of the display pixel PX, and the alignment state of the liquid crystal layer 70 can be controlled.

The countersubstrate 120 includes a transparent insulating substrate 28 of glass or the like, a transparent resin planarization film 29, a plurality of colored layers, and an alignment film (not shown).

The plurality of colored layers are organic insulating films, and include a first colored layer 24a, second colored layer 24b, and third colored layer 24c each of which is colored with a resist of one of red (R), green (G), and blue (B), and a fourth colored layer 27a and fifth colored layers 27b in black.

The red first colored layer 24a is arranged in a red display pixel, the green second colored layer 24b is arranged in a green display pixel, and the blue third colored layer 24c is arranged in a blue display pixel. The fourth colored layer 27a is a light shielding layer which is arranged around the display region 25 and prevents transmission of light in the frame region. The fifth colored layers 27b are light shielding layers which are arrayed in a matrix at positions where they face the scanning lines 11 and signal lines 12 of the array substrate 110, and prevent transmission of light between the display pixels PX.

The array substrate 110 and countersubstrate 120 are arranged so that their alignment films face each other, and are fixed by a sealing agent 26. Columnar spacers 22 are interposed between the array substrate 110 and the countersubstrate 120. The columnar spacers 22 keep constant the distance between the array substrate 110 and the countersubstrate 120. In the embodiment, the height of the columnar spacer 22 is arbitrarily controlled to fall within a range of 2 μm to 6 μm.

The liquid crystal layer 70 is arranged in a region defined by the array substrate 110, countersubstrate 120, and sealing agent 26. Polarizing plates (not shown) are respectively arranged on surfaces of the array substrate 110 and countersubstrate 120 that are opposite to the liquid crystal layer 70.

Next, a method of manufacturing the liquid crystal display apparatus according to the embodiment will be exemplified.

First, a method of forming the array substrate 110 will be explained. Film formation and patterning are repeated on the first transparent insulating substrate for cutting out a plurality of array substrates 110, thereby forming switching elements 14, scanning lines 11, signal lines 12, an insulating film L1, and other switching elements and various interconnections on the array substrate 110.

Then, an exposure resist is applied, exposed, and developed, yielding a planarization film 20 in the form of a transparent organic insulating film. At this time, the exposure resist is applied to the entire display region 25 and frame region. The embodiment employs a photocurable exposure resist. The photoresist is exposed via an exposure mask, developed, and formed into a planarization film 20 of a predetermined pattern having contact holes 21.

A transparent electrode material such as ITO is formed on the planarization film 20, and an exposure resist is further applied to the transparent electrode material. The exposure resist is exposed, developed, and patterned into a predetermined pattern of the connection electrodes 31 and common electrodes 30. The transparent electrode material is patterned by etching, and the exposure resist is removed, forming the common electrodes 30 of the predetermined pattern.

Film formation and patterning of molybdenum are performed on the common electrodes 30, film formation and patterning of aluminum are performed, and film formation and patterning of molybdenum are further performed. Electrode patterns of aluminum and molybdenum are formed a plurality of times on the first electrodes 30A and second electrodes 30B of the common electrodes 30, thereby forming sensor electrodes 40.

An exposure resist is applied to the sensor electrodes 40, exposed, and developed, forming an insulating film 50 having contact holes 51. A film of a transparent electrode material such as ITO is formed on the insulating film 50 and patterned into a predetermined pattern having slits 60S, thereby forming pixel electrodes 60. An alignment film having undergone rubbing processing in a predetermined direction is formed on the surfaces of the pixel electrodes 60.

Next, a method of forming the countersubstrate 120 will be explained. A colored exposure resist is repetitively applied, exposed, and developed on the second transparent insulating substrate for cutting out a plurality of countersubstrates 120, forming a first colored layer 24a, second colored layer 24b, third colored layer 24c, fourth colored layer 27a, and fifth colored layer 27b. A transparent resin material serving as the transparent resin planarization film 29 is applied to the plurality of colored layers, and patterned into a predetermined pattern, forming a transparent resin planarization film 29. Then, an alignment film having undergone rubbing processing in a predetermined direction is formed on the surface of the transparent resin planarization film 29.

Columnar spacers 22 are formed by applying, for example, a resin material to the first transparent insulating substrate or second transparent insulating substrate, and patterning it into a predetermined pattern.

Subsequently, a sealing agent 26 in the form of, for example, an ultraviolet-curable resin is applied to the first transparent insulating substrate or second transparent insulating substrate to surround the display region 25. The transparent insulating substrate serving as a plurality of array substrates 110 and the transparent insulating substrate serving as a plurality of countersubstrates 120 are aligned to face each other. The sealing agent 26 is irradiated with ultraviolet rays and cured, fixing the transparent insulating substrates.

A liquid crystal material may be injected into the display region 25 from an injection port formed in the sealing agent 26. Alternatively, before adhering the first and second transparent insulating substrates, a liquid crystal material may be dropped into a region defined by the sealing agent 26. When a liquid crystal material is injected from the injection port, the injection port is sealed with a sealing agent after injection, forming a liquid crystal layer 70. When a liquid crystal material is dropped, the first and second transparent insulating substrates are adhered after dropping, forming a liquid crystal layer 70.

While the first and second transparent insulating substrates are adhered to each other, a plurality of array substrates 110, and portions of the second transparent insulating substrate that face the array substrates 110 are cut out. Further, the second transparent insulating substrate is cut into the countersubstrate 120.

Thereafter, polarizing plates are arranged on surfaces of the array substrate 110 and countersubstrate 120 that are opposite to the liquid crystal layer 70, forming a liquid crystal display apparatus.

When sensor electrodes are integrally formed on one of paired substrates, a step is formed at the pattern end of a conductive layer or the like arranged below the sensor electrode, and the sensor electrode arranged on the conductive layer may be disconnected or a void may be formed. If the sensor electrode is disconnected or a void is formed, the resistance of the sensor electrode increases, decreasing the touch position detection accuracy or generating a short circuit.

As described above, in the liquid crystal display apparatus according to the embodiment, the common electrode 30 and sensor electrode 40 are formed to have the same potential. In addition, the second electrode 30B is arranged below the sensor electrode 40 between the first electrodes 30A of the common electrodes 30. Hence, the sensor electrode 40 is not arranged across a step at the pattern end of the first electrode 30A, preventing a disconnection of the sensor electrode 40 or formation of a void. The embodiment can therefore provide a liquid crystal display apparatus which includes low-resistance, high-quality sensor electrodes and has high touch position detection sensitivity.

Note that the width W2 of the second electrode 30B in a direction almost perpendicular to a direction in which the second electrode 30B extends between the first electrodes 30A is almost equal to the width W1 of the first sensor in the column direction and the width W1 of the second sensor in the row direction. However, the same effects as those of the above-described embodiment can be obtained as long as the width W2 of the second electrode 30B is equal to or larger than the width W1 of the first and second sensors. When the width W2 of the second electrode 30B is increased, it should be adjusted to neither increase the resistance of the common electrode 30 nor cause display nonuniformity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:

a plurality of pixels:

a switching element arranged in each of the pixels;

a signal line electrically connected to the switching element;

a pixel electrode electrically connected to the switching element through a contact portion and arranged in each of the pixels;

a common electrode opposed to the pixel electrode; and a metal wiring extending in a direction crossing an extending direction of the signal line, wherein the switching element includes a first switching element and a second switching element, the pixel electrode includes a first pixel electrode electrically connected to the first switching element through a first contact portion and a second pixel electrode electrically connected to the second switching element through a second contact portion, the common electrode comprises a slit which extends in the extending direction of the signal line and overlaps the signal line, the common electrode includes a plurality of openings arranged in the direction crossing the extending direction of the signal line, the first contact portion and the second contact portion are in one of the openings, and the metal wiring is arranged on and in contact with the common electrode.

2. The display device according to claim 1, wherein the common electrode is arranged below the metal wiring, and in the extending direction, a width of the metal wiring is less than a width of the common electrode at a position opposed to the metal wiring.

3. The display device according to claim 1, wherein the signal line is between the first contact portion and the second contact portion at the one of the openings, and the signal line overlaps the slit and the one of the openings.

4. The display device according to claim 1, wherein the metal wiring does not overlap the slit.

5. The display device according to claim 1, wherein the metal wiring does not overlap the openings.

* * * * *